350-96.16
7/13/82    OR    4,339,170

United States Patent [19]
Winzer

[11] 4,339,170
[45] Jul. 13, 1982

[54] OPTICAL DEVICE FOR FREQUENCY-SELECTIVE DISTRIBUTING LIGHT AND THE PROCESS OF PRODUCING THE DEVICE

[75] Inventor: Gerhard Winzer, Munich, Fed. Rep. of Germany

[73] Assignee: Siemens Aktiengesellschaft, Berlin & Munich, Fed. Rep. of Germany

[21] Appl. No.: 66,694

[22] Filed: Aug. 15, 1979

[30] Foreign Application Priority Data

Sep. 18, 1978 [DE] Fed. Rep. of Germany ....... 2840493

[51] Int. Cl.³ .............................................. G02B 5/14
[52] U.S. Cl. ............................ 350/96.16; 350/96.18; 350/172; 350/311
[58] Field of Search ............... 350/96.15, 96.16, 96.18, 350/96.20, 172, 311, 313, 316, 320

[56] References Cited

U.S. PATENT DOCUMENTS

| | | | |
|---|---|---|---|
| 3,619,030 | 11/1971 | Tomii et al. | 350/96.15 X |
| 3,870,396 | 3/1975 | Racki et al. | 350/96.16 |
| 3,874,779 | 4/1975 | Thiel | 350/96.16 |
| 3,937,557 | 2/1976 | Milton | 350/96.16 |
| 3,970,360 | 7/1976 | Kersten et al. | 350/96.15 |
| 4,102,559 | 7/1978 | Hunzinger | 350/96.18 |
| 4,176,908 | 12/1979 | Wagner | 350/96.15 |

FOREIGN PATENT DOCUMENTS

| | | | |
|---|---|---|---|
| 2655114 | 6/1977 | Fed. Rep. of Germany | 350/96.18 |
| 2900895 | 7/1979 | Fed. Rep. of Germany | 350/96.18 |
| 52-14417 | 2/1977 | Japan | 350/316 |
| 54-2144 | 1/1979 | Japan | 350/96.15 |

OTHER PUBLICATIONS

Ables, "Optics of Thin Films", *Advanced Optical Techniques*, North Holland Pub. Co., Amsterdam, 1967, pp. 185-186.
Knittel, "3.5.1 Interference Mirrors ... ", *Optics of Thin Films*, John Wiley & Sons, London, 1967, pp. 148-159.
Lynch, "Fiber Optic Connectors", *IBM Tech. Discl. Bull.*, vol. 13, No. 2, Jul. 1970, pp. 533-534.
Ishikawa et al., "Beam Splitting and Coupling Circuits ... ", *Proc. of Gen. Natl. Mtg. of IJECE* (1977), Mar. 1977, p. 4-220.

*Primary Examiner*—John D. Lee
*Attorney, Agent, or Firm*—Hill, Van Santen, Steadman, Chiara & Simpson

[57] ABSTRACT

An optical device for frequency-selectively distributing light characterized by waveguides for directing a beam of light at a beam divider filter layer which will reflect light of one frequency and pass light of another frequency to form two partial beams and at least one color filter arranged in the path of one of the partial beams to filter out light of a frequency different than the main frequency of the beam. The optical device can be expediently provided by producing two components which support the optical waveguides and are provided with abutting surfaces, assembling the components with the beam divider layer disposed between the abutting surfaces and providing at least one color filter on a transparent body aligned with the beam divider layer. Preferably, the transparent body is a gradient lens and the two components are formed by cutting a single member, which is either a flat plate or a capillary, into the two components after a waveguide such as an optical fiber has been secured to the member.

33 Claims, 7 Drawing Figures

OPTICAL DEVICE FOR FREQUENCY-SELECTIVE DISTRIBUTING LIGHT AND THE PROCESS OF PRODUCING THE DEVICE

BACKGROUND OF THE INVENTION

The present invention is directed to an optical device for frequency-selectively distributing light and in particular for demultiplexers in optical waveguide systems and to a process for producing the device.

Previously known frequency-selective optical light distributor devices have been constructed by means of either a blazed reflecting diffraction grating in conjunction with a gradient index lens, a CdS prism in association with two collimator lenses, a hologram, or a dichroic beam divider in the region of free beam propagation between collimator lenses. However, in particular, when used as a demultiplexer in optical waveguide systems, these types of light distributor elements necessitate a very high adjustment outlay and only possess poor selectivity. A high adjustment outlay is required, for example in the distributor element constructed with a CdS prism because of various reasons. These reasons include poor material dispersion, which requires following lenses to precisely focus the light onto the light inlet surfaces of the waveguide in the waveguide system, in particular, the end faces of the outgoing glass fibers or detector windows and that the position of the focal points arranged very close to one another would be determined by the dispersion angles. A poor selectivity is, for example, characteristic of the distributor element comprising a simple, obliquely adjusted dichroic beam divider in the region of free beam propagation.

SUMMARY OF THE INVENTION

The present invention is directed to providing an optical device for frequency-selectively distributing light particularly for demultiplexers in optical waveguide systems which device exhibits low insertion losses, has a high spectral selectivity and does not require expensive adjustment measures.

To accomplish these aims, the optical device comprises means for guiding a bean of light, beam divider means for selectively dividing the beam of light into a pair of partial beams of different frequencies and a color filter arranged in the path of at least one of the partial beams.

Preferably, the beam divider means comprises a beam divider filter composed of a layer of dichroic material.

Preferably, each of the color filters is also formed by a layer of dichroic material.

In a preferred embodiment of the proposed light distributor element, a lens is arranged between the beam divider means and each color filter. This lens is preferably a gradient lens.

Furthermore, in a preferred embodiment of the proposed light optical device, the beam dividing means is arranged between an incoming optical waveguide and an outgoing optical waveguide which are axially aligned. The optical waveguides of this type are preferably optical fibers which possess either a stepped index of refraction profile or a gradient index of refraction profile.

A special preferred embodiment is constructed so that the dichroic layer of the beam divider means is arranged at an angle of 45° to the optical axis of the waveguides which are axially aligned. This special embodiment is preferably provided with a lens which is preferably arranged in such a manner that its optical axis intersects the optical axis of the waveguide and meets the dichroic layer of the beam divider means at an angle of 45° to the surface normal of the layer.

Furthermore, the preferred embodiment of the proposed optical device can be designed in such a manner that an additional color filter is provided which is arranged in the region of the other partial beam. This additional color filter is likewise composed of a dichroic layer and an additional lens may be arranged between the filter and the beam divider means. In each of the embodiments, a light sensitive element may be arranged in the beam path of one of the partial beams.

In the proposed optical device, low insertion losses and high spectral selectivity is achieved in successive steps. First, the beam divider means carries out a coarse separation of the components of the various wavelengths with only a moderate selectivity. Then, the crosstalk in the outgoing channels which carry the partial beams or sub-beams is then greatly reduced by means of the color filter.

An additional fundamental advantage of the proposed light distributor device consists in its simple and easy production.

The process or method for producing the optical device which has a pair of components each supporting a waveguide, a beam divider means for selectively dividing the beam of light into a pair of partial beams of different frequencies being disposed between the waveguides and a color filter arranged in the path of at least one of the partial beams comprises the steps of forming a pair of components with the optical waveguides, each of said components being provided with an abutting surface extending transversely and obliquely to the axis of the waveguides; applying a layer of dichroic material on one of the abutting surfaces to form the beam divider means; assembling the two components with the abutting surfaces joined to one another with the dichroic layer extending therebetween and with the axis of the two waveguides being axially aligned; attaching a transparent body with an optical axis extending at an angle to the dichroic layer to one of said components; and attaching a color filter to said body for filtering a partial beam extending from the beam divider.

The transparent body preferably is a gradient lens which is preferably attached to the component prior to completion of the forming of the abutting surface. The color filter is preferably a dichroic layer of material which is applied to the end face of the transparent body either prior to or after the attachment of the gradient lens to the one component.

In the preferred process, the step of forming the pair of components can comprise providing a body having a groove, securing an optical waveguide such as an optical fiber in the groove, securing a gradient lens as a covering body to one component and attaching a simple member to the other component, forming the abutting surfaces so that the optical fiber has an end face which is flush with the abutting surface of both the component and the covering member or body. Then the dichroic layer is expendiently applied to one of the abutting surfaces of the body and the end face of the optical fiber flush therewith.

Instead of providing two bodies, a single member may be provided with the single waveguide such as the single fiber attached in the groove in the surface. Subsequently, the fiber and single member are cut transverse to the axis of the fiber and obliquely thereto to form the two bodies having the abutting surfaces. Preferably, the material of the body may be selected from a group consisting of a glass-ceramic and silicon.

In another preferred embodiment of the process, each of the components comprises a capillary of transparent material, such as glass, with an optical fiber secured in the bore of the capillary. The surfaces of the optical fiber and the capillary are formed to provide the abutting surface. As in the previous embodiment, a single member such as a single capillary may be provided, which is then cut into two halves with the cut extending transverse and oblique to the axis of the optical fiber to form the two components containing the waveguide. Then the surfaces are finished to form the abutting surface.

The optical waveguides are preferably assembled on their components by use of a transparent adhesive. The adhesive is also preferably used for joining or assembling the various components or parts of the bodies together.

In each of the embodiments, the two components with their waveguides are advantageously assembled by utilizing a base member having a stop. The steps of assembling include assembling the waveguides on the base member and moving the components until the abutting surfaces are engaged with each other and the components engage the stop to axially align the waveguides and then subsequently joining the parts together.

This carrier with a stop facilitates an easy and self-adjusting production of the proposed optical device. In order to facilitate the self-adjustment, it is advantageous to use components which at least in part exhibit a surface of a cylindrical body whose cylindrical axes run parallel to the optical waveguides secured to the component and with the waveguides being arranged in the same position relative to the surface in both components. The components are applied to the base in an identical fashion so that the surface contacts the base and the stop means. This ensures that the optical waveguides of both components possess the same distance from the base and from the stop surface and, thus, already occupy the correct position. Thus, additional optical adjustments are consequently not necessary. The only condition is that the surface of the component and the surface of the base should be produced with sufficient accuracy and this does not present any problems.

DESCRIPTION OF THE PREFERRED EMBODIMENTS

Figure 1:
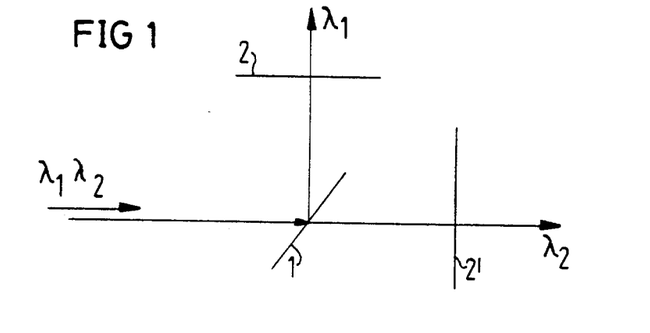
FIG. 1 is a schematic presentation of the fundamental construction of the proposed optical device in accordance with the present invention.

The principles of the present invention are particularly useful on an optical device for frequency-selectively distributing light which is schematically illustrated in FIG. 1. The optical device schematically includes a beam dividing means 1 and color filters 2 and 2'. As illustrated, a light beam containing wavelengths $\lambda_1$ and $\lambda_2$ are directed from the left hand side of FIG. 1 onto the beam divider means 1 which means, for example, exhibits good reflective power for the wavelength $\lambda_1$ and a good transmissive power for a wavelength $\lambda_2$. The light beam coming in from the left is then split into two sub-beams or partial beams with the partial beam reflected upward by the beam divider means fundamentally containing light of wavelength $\lambda_1$ and the partial beam which is transmitted toward the right fundamentally only containing light of wavelength $\lambda_2$.

In the path of the partial beam which fundamentally only contains the wavelength $\lambda_1$, there is provided a color filter 2 which exhibits good transmissive power for the wavelength $\lambda_1$ and good reflective power for the other wavelengths. A second color filter 2', which exhibits good transmissive power for the wavelength $\lambda_2$ and good reflective power for other wavelengths, is placed in the path of the other sub-beams or partial beam which fundamentally only contains the wavelength $\lambda_2$. Depending on the use of the device, it may be provided only with a single one of the two color filters 2 or 2' or with both filters.

Since the optical device is used as a light distributor device for multiplexers in optical waveguide systems, it, as a rule, is supplied with light via waveguides of this kind. The construction of the filter must be based on the consideration that since light falls within an angular spectrum corresponding to the numerical aperture of the fiber, the beam dividing means 1 only exhibits moderate selectivity and that, moreover, the S- and P-components of the light are influenced by the filter in different ways. This undesired effect is particularly manifest in interference filters of the Fabry-Perrot-type (see F. Ables' article, "Optics of Thin Films", *Advance Optical Techniques*, Edited by A. C. S. Van Heel, North-Holland Publishing Company, Amsterdam, 1967, pp. 185–186). However, if the beam divider filter means is constructed as a dichroic cut-on filter such as described, for example, in Z. Knittel, *Optics of Thin Films*, John Wiley & Sons, London, 1967, pp. 148–159, an extremely good preliminary selection between two wavelengths $\lambda_1$ and $\lambda_2$ can be achieved in respect to unpolarized light with an angle of an incidence of 45°.

Figure 2:
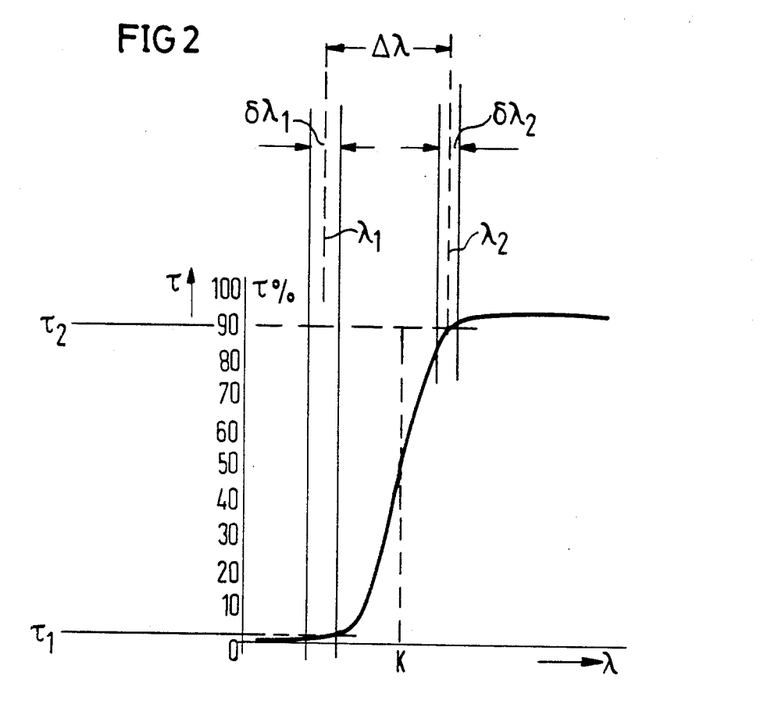
FIG. 2 is a transmission curve for various wavelengths for a known dichroic filter which can be used in the present invention.

The diagram or graph of FIG. 2 schematically illustrates a curve showing the transmission versus wavelengths for the cut-on filters of the type in question. The position of the filter edge K must lie within the wavelength range used in optical data transmission. At the present time this means that the filter edge must be positioned above 800 nm.

In accordance with the curve of FIG. 2, light containing information on a carrier and having a wavelength of $\lambda_1 \pm \delta\lambda_1$ with $r_1 = 1 - \tau_1 \geq 95\%$ ($\tau_1$ is the transmission coefficient for the wavelength range $\lambda_1$ and $r_1$ is its reflection coefficient) is reflected in the direction of the color filter 2. Light containing information on a carrier and having a wavelength of $\lambda_2 \pm \delta\lambda_2/2$ with $\tau_2 \geq 90\%$ (where $\tau_2$ is the transmission coefficient of the filter for a wavelength range around $\lambda_2$) will pass through the filter. Due to the angular spectrum of the oncoming light, a further deterioration of 10% can be assumed for both values, for example $r_1$ can be assumed to be equal to or greater than 85% and $\tau_2$ can be assumed to be equal to or greater than 80%.

Thus, it can be assumed that the color filter 2 receives a partial beam of light which at least 80% is composed of light in a wavelength range around $\lambda_1$ and color filter 2' receives a partial beam of light which at least 80% or more is composed of light in a wavelength range around $\lambda_2$. The color filter 2 and 2' now exert a further selective influence upon the light which has been projected thereat. In order to increase the separating capacity of the overall light distributing device, it is expedient to arrange a lens, in particular, a gradient lens, between the beam divider means 1 and each color filter 2 and 2' for the relevant partial beam. In this way, the light beam can be expanded by the lens and directed to have a perpendicular incidence on the color filter, which will produce a better selectivity than the selectivity which can be achieved when the light is directed solely by the beam dividing means 1. In the same way as the beam dividing means may be constructed of a dichroic layer, each of the color filters 2 and 2' can be constructed from a dichroic cut-on filter as have already been described hereinabove. In this case, the following values can be achieved for the transmission coefficient and reflection coefficient. Color filters 2 have a transmission coefficient for the wavelength of $\lambda_1 = 95\%$ and a reflection coefficient for the wavelength of $\lambda_2 = 99.8\%$. Color filter 2' has a transmission coefficient for a wavelength of $\lambda_2 = 95\%$ and a reflection coefficient for a wavelength of $\lambda_1 = 99.8\%$.

On this basis, the following values may be calculated for insertion losses and crosstalk attenuation of the overall light distributor device. For color filter 2 for wavelength $\lambda_1$, the value is determined by the same reflection coefficient of the beam divider means for this $\lambda_1$ times the transmission coefficient of the color filter 2 and the value is greater than $0.85 \times 0.95$ which will correspond to a $-0.93$ dB. For the wavelength $\lambda_2$, the value is determined by the same reflection coefficient as a beam divider means for this wavelength $\lambda_2$ times the transmission coefficient of the color filter for this wavelength and this value is less than $0.2 \times 0.002$ which thus corresponds to a $-34$ dB. For color filter 2' for a wavelength $\lambda_1$, the value is determined by the same transmission coefficients for the wavelength $\lambda_1$ of the beam divider means times the transmission coefficient for this wavelength of the color filter 2' and the value is less than $0.15 \times 0.002$ which corresponds to a $-35$ dB. For a wavelength $\lambda_2$ the value is determined by the same transmission coefficient for this wavelength $\lambda_2$ of the beam divider means times the transmission coefficient for this wavelength of the color filter 2' and the values are greater than $0.8 \times 0.95$ which corresponds to $-1.19$ dB.

If it is assumed that additional insertion losses occur at the fiber junction points at a level of approximately 0.5 dB and coupling losses of approximately 0.8 dB occur at the joints between the complete demultiplexer and the incoming fiber, such as plug-in losses. It is also assumed that the overall insertion losses in respect to each wavelength channel remain below 2.5 dB and the selectivity is better than $-34$ dB. This adequately fulfills the requirements imposed by communication technology on the behavior of a demultiplexer.

Figure 3:
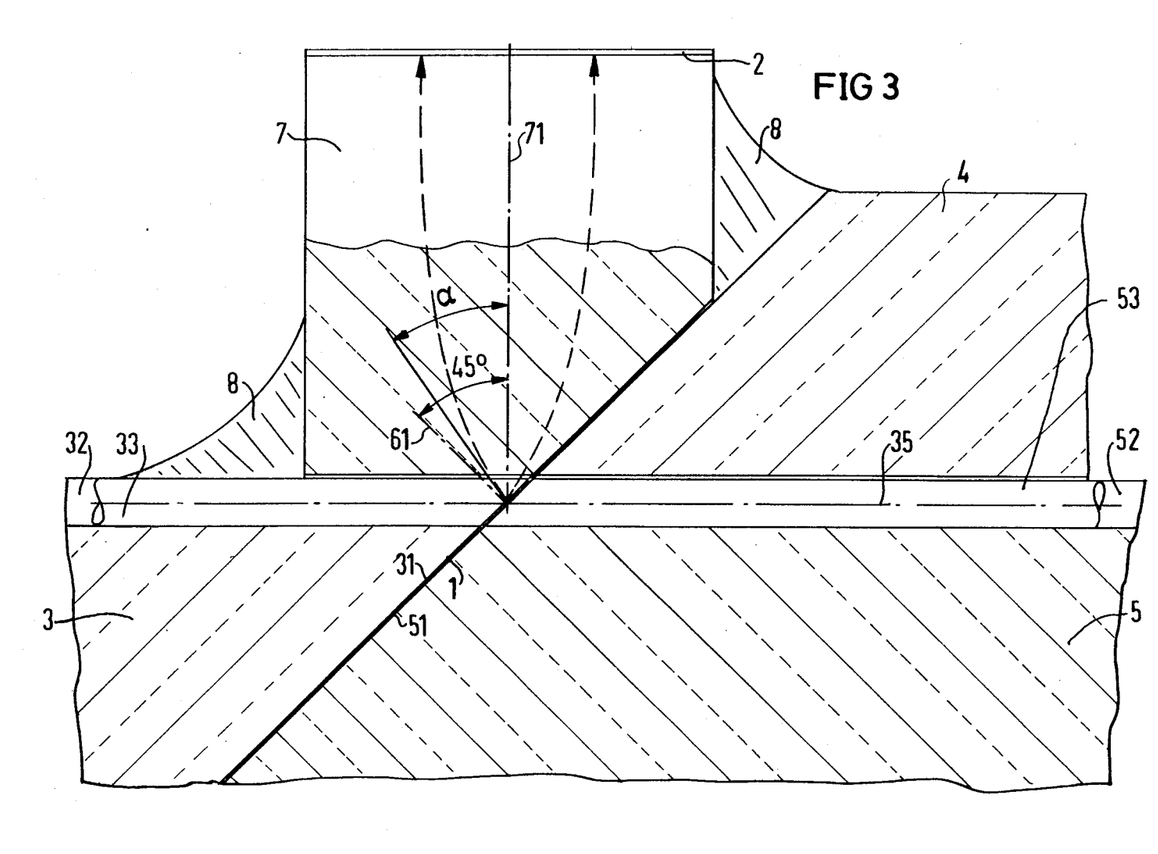
FIG. 3 is a longitudinal cross section with portions in elevation for purposes of illustration of an embodiment of the invention.
Figure 4:
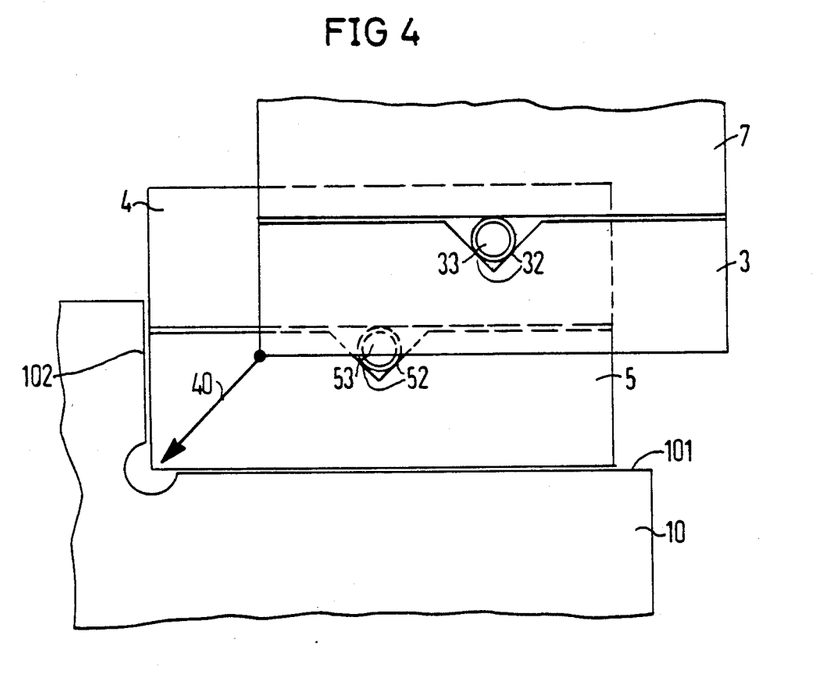
FIG. 4 is an end view of the embodiment of FIG. 3 showing movement of the various components into the assembled position.

One embodiment of an optical device in accordance with the present invention is illustrated in FIGS. 3 and 4. This embodiment is formed in the following process. An elongated, parallelepiped composed of a material selected from a glass ceramic material or silicon has a groove provided in one surface to extend parallel to the longitudinal edges of the parallelepiped. A glass fiber, which may have either a stepped index profile or gradient profile, acts as an optical waveguide and is placed in the groove where it is secured by means of a transparent optical cement, which preferably has an index of refraction enabling the cement to simultaneously serve as an immersion material.

The parallelepiped produced in this manner and having the light conducting optical fiber secured in its groove is now cut or split into two parts with the splitting extending transverse to the longitudinal axis and preferably obliquely to the axis of the optical fiber. Such a splitting or cutting can occur by utilizing a cutting plate. In this case, one of the parts produced in this way is covered by a covering component or member which is fixed to the relevant surface of the part and the other part or component is provided with a covering part or body which is preferably a gradient lens that simultaneously acts as a transparent covering body. The abutting surfaces are produced at the end of the two parts and intersect the axis of the glass fiber at an angle of 45°. As mentioned hereinabove, the cutting of the parallelepiped in two parts can be done with the cutting being at an angle of 45° to the axis of the fibers. Preferably, the abutting surfaces are arranged in such a manner that the intersection line between each abutting surface and the surface containing the groove run at right angles to the longitudinal axis of the original parallelepiped. The abutting surfaces are preferably produced so that the end surfaces, which are arranged opposite to one another of the two parts, are bevel-ground and then brought to optical quality by polishing.

A dichroic material is then vapor deposited onto one of the two abutting surfaces, preferably the abutting surface of the part which has the covering component, and thus forms a dichroic layer. The two components which have been formed in this manner are then assembled so that the two glass fibers are axially aligned with the abutting surfaces being arranged opposite one another and the dichroic layer being arranged therebetween.

This assembly can be advantageously effected in a self-adjusting fashion by using a base, which is provided with a stop means which projects beyond a flat surface of the base. The components are assembled so that they are applied on the base so that they can contact the stop means and their abutting surfaces are arranged opposite to one another and run in parallel with one another. Then, by displacing at least one of the components along the stop means, the two abutting surfaces are brought to the shortest possible distance from one another and the components which have been brought together in this manner are joined preferably by means of an optical cement. If the two components are assembled in accordance with the above described process, two glass fibers are arranged coaxially or axially aligned with a sufficient degree of accuracy.

The device formed in this manner is illustrated in FIGS. 3 and 4 wherein one component 3 has an abutting surface 31 and a guide groove 32, which receives a glass fiber 33. A gradient lens 7, which also acts as a covering component or body for the component 3, is secured by an adhesive 8 onto the upper surface of the component 3. The other component or body 5 has an abutting surface 51 and a groove 52, which has the fiber 53 secured therein. The component 5 also has a simple covering member 4 and the abutting surface 51 of the component 5 is also flush with the surface of the covering member 4 and with the end surface of the fiber 53. The grooves such as 52 and 32 have a V-shaped cross section (FIG. 4) and the fibers 33 and 53, respectively, are embedded in a transparent cement. These two fibers are illustrated as cladded-core glass fibers.

An optical axis 71 of the gradient lens 7 intersects a common optical axis 35 of the glass fibers 33 and 53 at a point at which the axis 35 passes through the dichroic layer 1. It is also expedient for the optical axis 71 to be arranged at right angles to the axis 35 and for the angle to a normal 61 of the dichroic layer 1 to amount to 45°. This could only be achieved by arranging the gradient lens partially above the surface of the component 3 that has the guide groove 32 and partially above the dichroic layer 1. The relevant end surface of the gradient lens must therefore have one-half of its surface which is at right angles to the optical axis 71 and one-half surface whose normal forms an angle of 45° with the optical axis 71. The dichroic layer 1 is applied to the abutting surface 31 and extends over the entire abutting surface of the component which includes part of the lens 7.

After the application of the dichroic layer 1, the two components 5 and 3 are joined together by means of an optical cement 8. The color filter 2 is expediently directly applied to the end surface of the gradient lens 7 which end surface is away from the beam divider means formed by the layer 1. As in the case of the beam divider means 1, this application consists of vapor depositing the layer of suitable dichroic material onto this end surface. This can be effected either before or after the fixing of the gradient lens 7 on the component 3 but preferably prior to the attachment thereof. Preferably, the optical axis 71 of the gradient lens 7 is arranged at right angles to the end surface which bears the color filter 2.

The self-adjusting assembly of the two components employs a carrier 10, which has a flat surface 101 and stop means formed by a surface 102 as illustrated in FIG. 4. The stop surface 102 and the flat surface 101 extend in perpendicular planes to each other with both planes extending in the longitudinal direction of the fibers of the components that are to be assembled thereon. The components provided with the covering member or bodies such as the component 3 with the lens 7 and the component 5 with the covering plate 4 are arranged to rest on the flat surface 101 of the carrier 10 with one edge abutting the stop surface 102.

As illustrated in FIG. 4, the component 5 with the cover 4 is in the approximate assembled position. The component 3 with the lens 7 is moved in the direction such as indicated by the arrow 40 so that its bottom surface is engaged on the flat surface 101 and its edges engaged on the surface 102. When the bottom of the component 3 is on the surface 101, the two components can be moved together so that their abutting surfaces such as 31 and 51 come into contact with the dichroic layer which is carried on one of the surfaces and is the divider means. After both components have been displaced on the carrier 10 so that one surface engages the stop surface 102 and the abutting surfaces are in contact with the dichroic layer 1, the components are then cemented together.

In a production of the embodiment illustrated in FIGS. 3 and 4, the gradient lens 7 was expediently applied on the component 3 prior to the grinding and polishing of the abutment surface 31 and itself is processed during this procedure.

Figure 5:
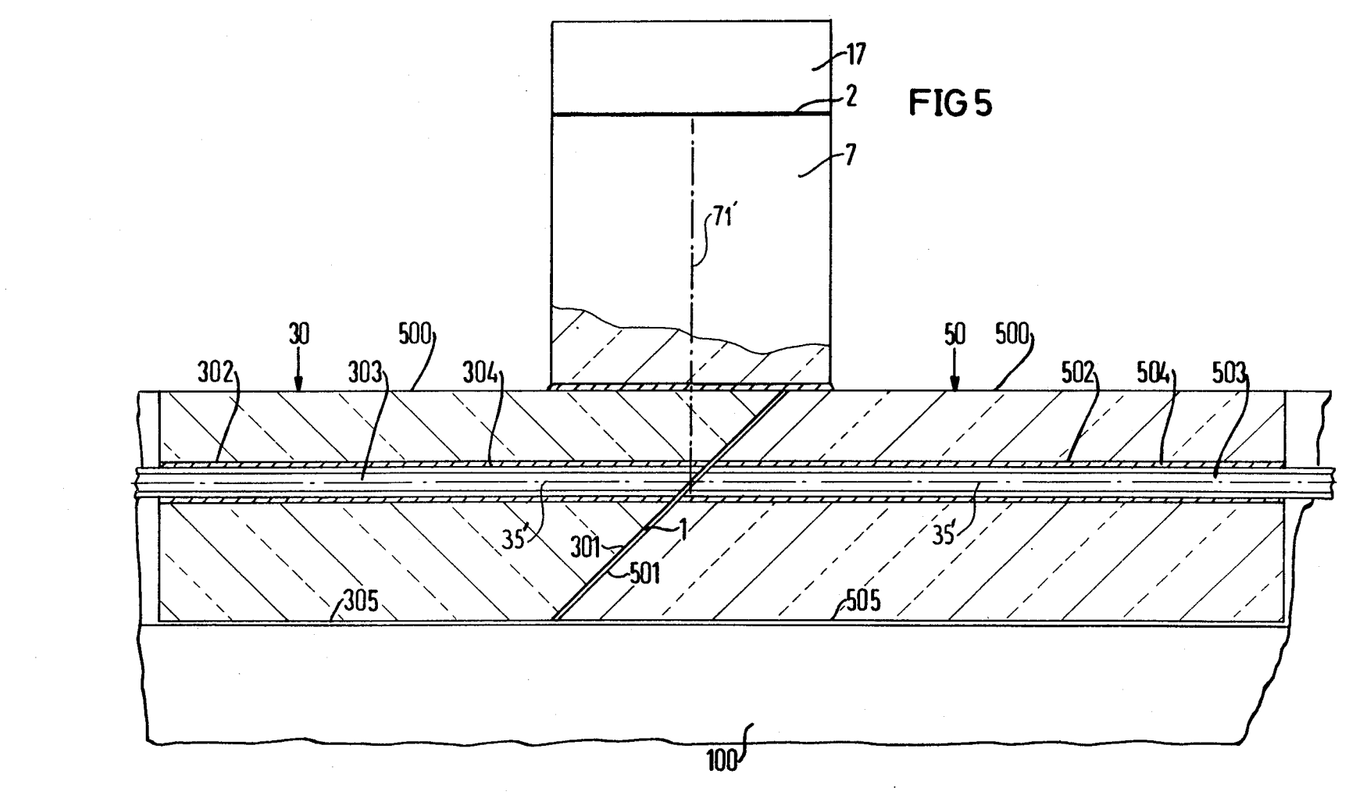
FIG. 5 is a longitudinal cross section with portions in elevation for purposes of illustration of a second embodiment of the present invention.

A second embodiment of the invention is illustrated in FIG. 5. In this embodiment, each of the components 30 and 50 are capillaries, such as glass capillary tubes, having bores or openings 302 and 502, respectively. Cladded glass fibers 303 and 503, respectively, are secured by means of an optical cement 304 and 504 in the bores 302 and 502, respectively.

All of the further details of the embodiment can be best explained by describing the production process of this embodiment. Preferably, a glass fiber having a casing diameter of approximately 120 μm is introduced into a glass capillary which has a bore of a diameter of approximately 130 μm and an outer diameter of approximately 5 mm. The inserted glass fiber is then secured in the capillary by means of an optical cement such as 304 and 504.

Before introducing the fiber into the glass capillary tube, the tube may be provided by grinding and polishing with either one flat surface or a pair of parallel, flat surfaces which extend over the entire length of the tube and also are parallel to the axis of the bore and the fiber that will be disposed therein. The surfaces are the upper surfaces 500 illustrated in FIGS. 5 and 6 as well as the lower parallel surfaces 305 and 505, respectively. After providing the flat surfaces and after the fiber is cemented in the tube, the tube is preferably split or cut into two halves with the cutting being in a plane extending at an angle of 45° to an axis 35' of the fibers and also at an angle of 45° to the flat surfaces such as 500. Such cutting may be accomplished by a cutting plate which will have a cutting thickness as small as possible such as 300 μm.

Figure 6:
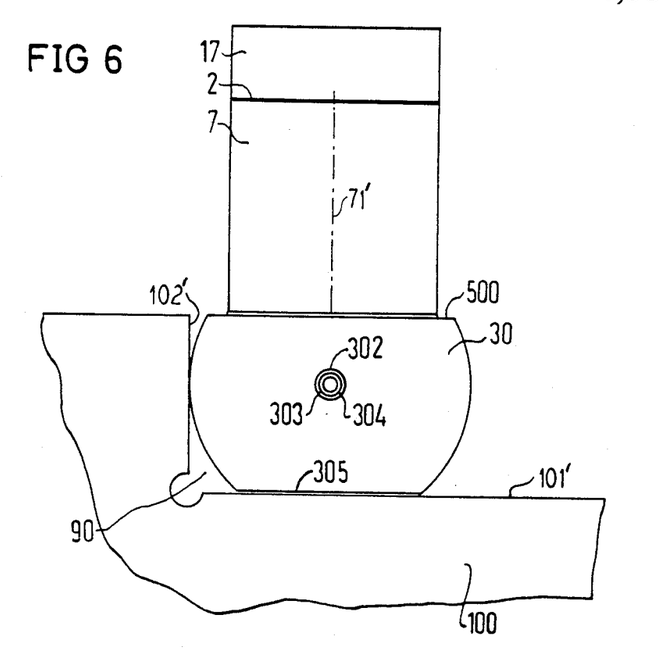
FIG. 6 is an end view of the embodiment of FIG. 5.

The two cut-surfaces, which have been formed in this way, are then optically polished so that the two capillary halves 30 and 50 are provided with abutting surfaces 301 and 501, respectively, as illustrated in FIGS. 5 and 6. As described earlier, a beam divider means comprising a dichroic layer 1 is applied to one of the two surfaces 301 or 501. The dichroic layer may be applied, for example, by vapor depositing onto the abutting surface 301.

The two capillary halves are now placed on a carrier 100, which is similar to the construction of the carrier 10 and has a flat surface 101' and a stop surface 102' extending perpendicular thereto. As illustrated in FIGS. 5 and 6, the flat surfaces 305 and 505 will be resting on the surface 101' and a curved portion of each of the components 30 and 50 will be engaged on the stop surface 102'. After the two halves are brought together so that the free abutting surface, such as 501 contacts the beam divider means 1, they are then firmly joined to the carrier by means of an adhesive such as, for example, an optical cement.

After joining the components together, the surface 500 which runs parallel to the surfaces 305 and 505 may be produced on the capillary halves which have been joined together if it had not already been previously formed prior to severing of the tube into the two parts 30 and 50. Then a gradient lens 7 is cemented on the surface 500 in such a manner that its axis 71' intersects the axis 35' of the joined fiber halves. As in the embodiment illustrated in FIGS. 3 and 4, the narrow band transmission filter 2 is arranged on the other end face of the lens 7.

The two embodiments illustrated in FIGS. 3-6 can also be modified so that the gradient lens with the color filter is not applied to the side of the glass fiber but to one end of the fiber half and coaxially therewith. The color filters applied in this manner would form the filter 2' of FIG. 1. It is also sometimes desirable to provide a light sensitive element 17 which is applied directly to the color filter 2 as illustrated in FIG. 5 or to a color filter 2' if it is present. This light sensing element can easily be attached by an adhesive layer.

Figure 7:
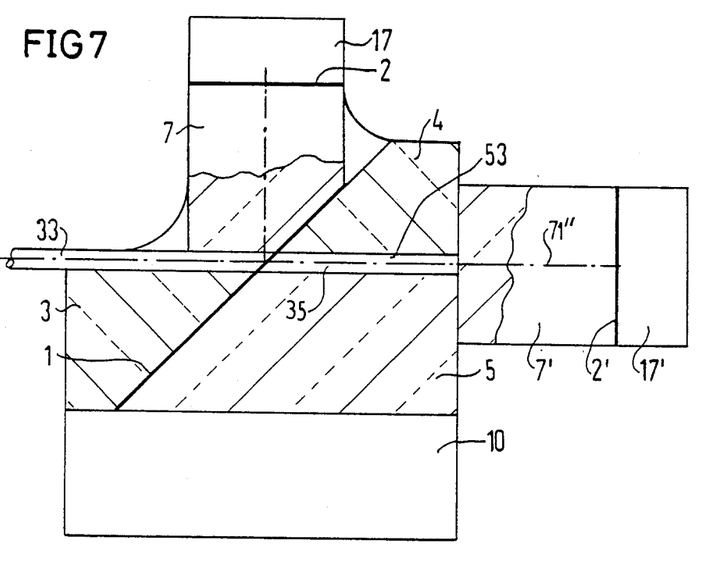
FIG. 7 is a cross section with portions in elevation for purposes of illustration of a further modification of the embodiment of FIG. 3.

In certain applications, it is also expedient to provide both a gradient lens with a color filter 2 and a gradient lens with a color filter 2'. As illustrated in FIG. 7, the embodiment of FIGS. 3 and 4 has been further modified by the addition of a second gradient lens 7'. The gradient lens 7' is applied with its axis 71" being coaxial with the axis 35 of the fiber 53. The lens 7' has the additional color filter 2'. As illustrated, the color filter 2 has been provided with light sensitive element 17 which has been applied directly thereon and the color filter 2' is provided with a light sensitive element 17'.

In each of the embodiments described hereinabove, the waveguide formed by an optical fiber was secured to a member, which was then severed to form the two components. It is possible to form each of the components separately and then match their abutting surfaces. However, it should be noted that when the components are formed from a single element that has been severed into the two parts, the abutting surfaces which are formed on the cut surfaces will easily match.

Although various minor modifications may be suggested by those versed in the art, it should be understood that I wish to embody within the scope of the patent granted hereon, all such modifications as reasonably and properly come within the scope of my contribution to the art.

I claim:

1. In an optical device for frequency selectively distributing light by separating light of one wavelength from light of another wavelength, particularly for demultiplexers in optical waveguide systems, said device comprising means for guiding a beam of light, beam divider means for selectively dividing the beam into a pair of partial beams of different wavelengths, said beam divider means being a frequency-selective divider layer being disposed obliquely with respect to the direction of incident light in said means for guiding, said divider layer passing the greatest part of the light of the one wavelength in one of the pair of partial beams and reflecting the greatest part of the light of the other wavelength in the other of the pair of partial beams, one color filter being disposed in the path of the one partial beam, and another color filter disposed in the path of the other partial beam, the improvements comprising the one color filter disposed in the one path of the one partial beam of the light passed by the divider layer being transmissive to the one wavelength and being impermeable to the other wavelength and the other color filter in the other path of light reflected by the divider layer being transmissive to the other wavelength and being impermeable to said one wavelength so that light of the other wavelength contained in the one partial beam to the slightest degree is removed by the one color filter while light of the one wavelength which is contained in the other partial beam to the slightest degree is removed by the other color filter.

2. In an optical device according to claim 1, wherein the beam divider layer is composed of a layer of dichroic material.

3. In an optical device according to claim 1, wherein each color filter is composed of a layer of dichroic material.

4. In an optical device according to claim 3, wherein the beam divider layer comprises a layer of dichroic material.

5. In an optical device according to claim 1, which includes a lens positioned between the beam divider means and each color filter.

6. In an optical device according to claim 5, wherein each lens is a gradient lens.

7. In an optical device according to claim 1, wherein the means for guiding the light comprises an incoming optical waveguide and an outgoing optical waveguide, and said beam divider means is arranged between the incoming and outgoing waveguides so that the one partial beam passes through the outgoing waveguide and the other partial beam is deflected from the outgoing waveguide.

8. In an optical device according to claim 7, wherein each of the optical waveguides are composed of a glass fiber.

9. In an optical device according to claim 8, wherein each of the glass fibers possesses a stepped index of refraction profile.

10. In an optical device according to claim 8, wherein each of the glass fibers has a gradient profile for the index of refraction.

11. In an optical device according to claim 7, wherein the beam divider layer comprises a dichroic layer arranged to extend at an angle of 45° to the incoming and outgoing optical waveguides which are axially aligned.

12. In an optical device according to claim 11, which includes a lens having an optical axis being disposed between the dichroic layer and the other color filter with the optical axis of the lens being at an angle of 45° relative to the normal of the surface of the dichroic layer.

13. In an optical device according to claim 12, wherein each of the color filters is composed of a dichroic layer.

14. In an optical device according to claim 13, wherein a lens is arranged between each of the color filters and the beam divider layer.

15. In an optical device according to claim 13, wherein each of the lenses is a gradient lens.

16. In an optical device according to claim 7, wherein each of the optical waveguides is composed of a glass fiber, said optical device including a support component for each of said glass fibers, said glass fibers and support components having abutting end surfaces extending at 45° to the optical axis of the fibers, at least one of said end surfaces being provided with the beam divider layer comprising a dichroic layer disposed on one of said ends and said device including means for positioning said fibers and support components in abutting relationship with the optical axis of each fiber being axially aligned.

17. In an optical device according to claim 16, wherein each of the support components comprises a flat surface having a groove receiving the fiber.

18. In an optical device according to claim 16, wherein each of the support components comprises a capillary tube having a bore with the optical fiber being received therein.

19. In an optical device according to claim 1, which includes at least one light sensitive element arranged in the partial beam path of at least one of the partial beams.

20. A process for producing an optical device for frequency-selectively distributing light, said optical device comprising a pair of components each supporting a waveguide, beam divider means for selectively dividing a beam of light into a pair of partial beams of different frequencies being disposed between the waveguides, and a color filter arranged in the path of each of the partial beams, said process comprising forming a pair of the components with the optical waveguides, each of said components being provided with an abutting surface extending transversely and obliquely to the axis of the waveguides; applying a layer of dichroic material on one of the abutting surfaces to form the beam divider means; assembling the two components with the abutting surfaces joined to one another with the dichroic layer extending therebetween and with the axis of the two waveguides being axially aligned; attaching a transparent body with an optical axis extending at an angle to the dichroic layer to one of said components; and attaching a color filter to said body for filtering a partial beam extending from the beam divider.

21. A process according to claim 20, wherein the body is a gradient lens, said step of attaching the filter comprising applying a layer of dichroic material to act as the color filter to one end of the gradient lens prior to attaching the lens to the component.

22. A process according to claim 20, wherein each of the components is a body having a groove, each of said waveguides being an optical fiber secured in the groove, said transparent body being a gradient lens; said step of attaching the body being accomplished before completing the forming of the components with the axis of the body extending perpendicular to the fiber axis; said step of forming the components including attaching a simple cover body on the other component and forming the abutting surfaces on the components with the end surfaces of the optical fibers of the respective components being flush with the abutting surfaces of the components and with the covering bodies.

23. A process according to claim 22, wherein a dichroic layer forming the beam divider means is applied to the component provided with a gradient lens as a transparent body.

24. A process according to claim 20, wherein each of the components is produced with the same material.

25. A process according to claim 24, wherein the material for the component bodies is selected from a group consisting of ceramic material and silicon.

26. A process according to claim 20, wherein the step of providing the pair of components comprises providing a capillary tube having a longitudinally extending bore, securing a waveguide in the bore, cutting the capillary tube and waveguide transverse to the axis of the waveguide to form the abutting surface of the component with the abutting surface of the capillary tube and waveguide being flush.

27. A process according to claim 26, wherein the capillary tube is a glass capillary.

28. A process according to claim 20, wherein the step of providing a pair of components comprises providing a single member, attaching a waveguide to said single member, cutting said single member transverse to the optical axis of the waveguide into two members to produce said two components.

29. A process according to claim 28, wherein the step of cutting comprises utilizing a cutting plate.

30. A process according to claim 28, wherein the step of cutting comprises cutting the single member transverse and obliquely to the axis of the waveguide so that the cut surfaces can be finished into an abutting surface extending transversely and obliquely to the axis of the waveguide.

31. A process according to claim 28, wherein the optical waveguide is secured on the single member by means of a transparent adhesive.

32. A process according to claim 20, wherein the step of assembling and attaching the various components and bodies of the device together is accomplished by utilizing an adhesive.

33. A process according to claim 20, wherein the device includes a base member having a stop, said step of assembling the components containing the waveguides includes assembling the components on the base member and moving the components until the abutting surfaces are engaged with each other and the stop is engaged to axially align the waveguides and then subsequently joining the engaged surfaces together.

* * * * *